US009355748B2

(12) United States Patent
Bunce

(10) Patent No.: US 9,355,748 B2
(45) Date of Patent: May 31, 2016

(54) ROTARY ACTUATOR

(71) Applicant: ROLLS-ROYCE PLC, London (GB)

(72) Inventor: Ian Michael Bunce, Derby (GB)

(73) Assignee: ROLLS-ROYCE plc, London (GB)

(*) Notice: Subject to any disclaimer, the term of this patent is extended or adjusted under 35 U.S.C. 154(b) by 560 days.

(21) Appl. No.: 13/826,384

(22) Filed: Mar. 14, 2013

(65) Prior Publication Data
US 2013/0329846 A1 Dec. 12, 2013

(30) Foreign Application Priority Data

Jun. 12, 2012 (GB) .................................. 1210316.4

(51) Int. Cl.
G21C 7/06 (2006.01)
G21C 7/16 (2006.01)
G21C 7/14 (2006.01)

(52) U.S. Cl.
CPC .. *G21C 7/16* (2013.01); *G21C 7/14* (2013.01); Y02E 30/39 (2013.01)

(58) Field of Classification Search
CPC .............. G21C 7/00; G21C 7/06; G21C 7/08; G21C 7/12; G21C 7/14; G21C 7/16
See application file for complete search history.

(56) References Cited

U.S. PATENT DOCUMENTS 3,278,385 A 10/1966 Dufrane
3,429,203 A * 2/1969 Bass .................. G21C 7/12
376/223

FOREIGN PATENT DOCUMENTS

FR 2 495 814 A1 6/1982
GB 910203 A 4/1960

OTHER PUBLICATIONS

British Search Report issued in Application No. 1210316.4; Dated Dec. 18, 2012.

* cited by examiner

*Primary Examiner* — Marshall O'Connor
(74) *Attorney, Agent, or Firm* — Oliff PLC

(57) ABSTRACT

A rotary actuator has a driven element including a plurality of recesses that are spaced in a circumferential arrangement around an axis of rotation of the driven element by a spacing angle, and first, second and third latch elements that are each movable between a retracted position, and an extended position in which it is engageable with a corresponding one of the recesses. Sequential movement of the first, second and third latch elements between retracted and extended positions causes rotation of the driven element.

14 Claims, 4 Drawing Sheets

ROTARY ACTUATOR

This invention claims the benefit of UK Patent Application No. 1210316.4, filed on 12 Jun. 2012, which is hereby incorporated herein in its entirety.

FIELD OF THE INVENTION

The present invention relates to a rotary actuator and particularly, but not exclusively, to a rotary actuator for the movement of control rods in a light water nuclear reactor.

BACKGROUND TO THE INVENTION

Control rods are used in nuclear reactors to control the rate of fission of uranium (or other fissile material) and, as such, are capable of absorbing many neutrons without fissioning themselves.

A control rod can be removed from or inserted into the central core of a nuclear reactor in order to control the neutron flux, i.e. to increase or decrease the number of neutrons which will split further uranium atoms. This in turn increases or decreases the thermal power generated by the reactor which (for a light water reactor) determines the amount of steam produced, and thereby the quantity of electricity which is generated.

In a conventional nuclear reactor, control rods are combined into control rod assemblies which are positioned within guide tubes in an individual nuclear fuel element. Such control rod assemblies may typically comprise up to twenty control rods.

Typically, control rod assemblies are arranged vertically within the nuclear reactor core, being inserted into the core from above, with the control rod drive mechanisms being mounted on an upper surface of the reactor pressure vessel. The mass of a control rod assembly will be dependent upon the detailed design of the reactor core but, for a civil nuclear reactor, is typically of the order of up to approximately 100 kg.

In use, one or more of the control rods are partially withdrawn from the reactor core in order to allow a chain reaction to occur. The quantity of control rods which are withdrawn and the distance by which they are withdrawn may be varied to control the reactivity of the reactor.

A typical control rod for a civil nuclear reactor design may be up to approximately 4 m in length. It is therefore necessary that an actuator for a control rod drive mechanism has a travel of at least such a distance, i.e. at least 4 m, in order that the control rod may be fully withdrawn from the reactor core.

Existing civil nuclear reactor control rod drive mechanisms typically use magnetic jack arrangements. A known problem with such arrangements is the inability to use the drive mechanism inside the primary containment boundary of the reactor due to the associated high temperatures and pressures. As a result, the control drive mechanism must be positioned outside the reactor core assembly. This increases the size and complexity of the reactor assembly.

STATEMENTS OF INVENTION

According to a first aspect of the present invention there is provided a rotary actuator comprising:
 a driven element comprising an axis of rotation and a plurality of recesses, the recesses being spaced around the axis of rotation by a spacing angle; and
 first, second and third latch elements, each latch element being movable between a retracted position, and an extended position in which it engagingly locates against one or more of the plurality of recesses;
 the first latch element being aligned with any one or more of the plurality of recesses, the second and third latch elements respectively being offset, in rotationally opposite directions around the axis of rotation, from any one or more of the plurality of recesses by an offset angle of greater than the spacing angle;
 whereby sequential movement of the first, second and third latch elements between respective retracted and extended positions causes rotation of the driven element.

The angularly offset arrangement and the sequential operation of the latch elements enables the driven element of the actuator to rotate in a stepwise manner. The stepwise motion enables the position of the driven element to be precisely controlled. Since each driven element is connected to a control rod assembly, this stepwise motion enables the position of the control rod assembly within the nuclear reactor core to be precisely controlled. This in turn enables the amount of thermal energy generated by the reactor core, and hence electrical power generated, to be precisely controlled by a user.

In the present example, the offset angle is approximately 1.33 times the spacing angle. However, in other examples the offset angle may be between 1.1 and 1.4 times the spacing angle.

The movement of the latch elements and their respective interaction with the recesses of the driven element, being purely mechanical, can take place within the primary containment boundary of the reactor core without any adverse consequences resulting from the associated environmental conditions (i.e. high temperatures and pressures).

An advantage of the mechanical nature of the interaction between the latch elements and the recesses of the driven element is that the process is simple, reliable and cost-effective.

Optionally, each of the plurality of recesses is positioned in a co-planar arrangement around the axis of rotation.

Arranging the plurality of recesses in a co-planar configuration enables the first, second and third latch elements to each engage successively with each of the recesses. This means that a single set of recesses arranged circumferentially around the axis of the driven element can be used to effect the rotary motion of the actuator. This simplifies the structure of the rotary actuator and makes it more cost effective.

In the present example, the recesses are formed as radiussed channels arranged in a symmetrical array and circumferentially around the axis of rotation of the driven element.

In alternative examples, the recesses may be formed with alternative geometries.

Optionally, each of the first, second and third latch elements is biased towards the respective retracted position.

In the event of a failure of any of the actuators which drive the first, second and third latch elements, the respective biasing element causes the corresponding latch element to move to the retracted position. This results in the corresponding control rod assembly dropping into the reactor core which in turn will decrease the thermal energy generated by the reactor, i.e. a "fail safe" mode.

Optionally, each of the first, second and third latch elements has an actuating portion being configured to move the latch element between retracted and extended positions.

In the present arrangement each of the first, second and third latch elements is provided with a corresponding actuating portion which is arranged to move the respective latch element between retracted and extended positions. This enables the use of simple, linear-acting actuating portions which makes the rotary actuator simpler to operate and more cost-effective to manufacture than conventional control rod actuators.

In alternative arrangements, each of the actuating portions is configured to move the respective latch element in a curved or other non-linear direction between retracted and extended positions.

Optionally, each actuating portion is one of a mechanical, hydraulic or pneumatic actuator.

In the present arrangement, each actuating portion is a hydraulic actuator. In this arrangement, the reactor coolant is used as the working fluid in the hydraulic actuator. The hydraulic actuators are sized such that the standard circulating pressure of the coolant is sufficient for their operation in enabling rotation of the driven element of the rotary actuator. This arrangement has the advantage of not requiring a secondary hydraulic fluid system to enable operation of the rotary actuator, thus making the rotary actuator simpler, more reliable and more cost-effective than conventional control rod actuators.

In an alternative arrangement, the hydraulic actuators may be supplied with a pressurised working fluid which is separate to the pressurised nuclear reactor coolant.

Optionally, each of the first, second and third latch elements comprises a circular engaging element, the engaging element being arranged to engagingly locate in one of the plurality of recesses.

In the present example, the engaging element comprises a rotatable circular element whose profile conforms closely to the profile of the plurality of recesses. The ability of the engaging element to rotate provides a rolling contact between the engaging element and the recess. This reduces the frictional forces generated during contact and so reduces the forces required to be generated by the latch elements during the operation of the rotary actuator.

According to a second aspect of the present invention there is provided a control rod assembly for a light water nuclear reactor comprising:
 a control rod, having a plurality of lateral recesses, the recesses being spaced apart from one another along the control rod;
 a rotary actuator according to the present invention; and
 a brake element configured to engage with at least one of the plurality of recesses to prevent linear movement of the control rod When actuated, the brake element prevents rotation of the driven element. The driven element is drivingly coupled to a control rod being part of a control rod assembly. Consequently, when actuated, the brake element prevents movement of the corresponding control rod.

When the latch elements are all in their retracted position (i.e. when none of the actuators are energised), the control rod moves under the action of its own weight to a position in which it is fully inserted into the nuclear reactor. In this situation, the brake element acts to maintain the control rod in the fully inserted position.

According to a third aspect of the present invention there is provided a method of using a rotary actuator, the rotary actuator comprising
 a driven element comprising an axis of rotation and a plurality of recesses, the recesses being spaced around the axis of rotation by a spacing angle; and
 first, second and third latch elements, each latch element being movable between a retracted position, and an extended position in which it engagingly locates against one or more of the plurality of recesses;
 the first latch element being aligned with any one or more of the plurality of recesses, the second and third latch elements respectively being offset, in rotationally opposite directions around the axis of rotation, from any one or more of the plurality of recesses by an offset angle of greater than the spacing angle;
the method comprising the steps of:
 (a) moving the first latch element from its retracted position to its extended position; and
 (b) moving the second latch element from its retracted position to a partially extended position in which it contacts the driven element; and
 (c) returning the first latch element from its extended position to its retracted position whilst simultaneously continuing the movement of the second latch element from its partially extended position to its extended position, thereby causing a first rotation of the driven element around the axis of rotation in a first direction.

Optionally, the method comprises the further steps of:
 (d) moving the third latch element from its retracted position to a partially extended position in which it contacts the driven element; and
 (e) returning the second latch element from its extended position to its retracted position whilst simultaneously continuing the movement of the third latch element from its partially extended position to its extended position, thereby causing a second rotation of the driven element around the axis of rotation in a first direction.

Optionally, the method comprises the further steps of:
 (f) moving the second latch element from its retracted position to its partially extended position in which it contacts the driven element; and
 (g) returning the third latch element from its extended position to its retracted position whilst simultaneously continuing the movement of the second latch element from its partially extended position to its extended position, thereby causing a first rotation of the driven element around the axis of rotation in a second direction.

Optionally, the method comprises the further steps of:
 (h) moving the first latch element from its retracted position to its partially extended position in which it contacts the driven element; and
 (i) returning the second latch element from its extended position to its retracted position whilst simultaneously continuing the movement of the first latch element from its partially extended position to its extended position, thereby causing a second rotation of the driven element around the axis of rotation in a second direction.

According to a fourth aspect of the present invention there is provided a method of deploying a control rod for a light water nuclear reactor, the nuclear reactor comprising a control rod assembly having a control rod and a rotary actuator, the method comprising the step of:
 (1) using the rotary actuator according to any one of claims 8 to 11 to drivingly rotate a shaft, the shaft being coupled to the control rod, so as to control the insertion of the control rod into the nuclear reactor.

Optionally, the control rod assembly comprises a brake element, the brake element being movable between a retracted position and an extended position and the method comprises the further step of:
 (2) moving the brake element from the retracted position to the extended position, thereby preventing rotation of the shaft and maintaining the control rod in a fixed position within the nuclear reactor.

Other aspects of the invention provide devices and methods which include and/or implement some or all of the actions described herein. The illustrative aspects of the invention are designed to solve one or more of the problems herein described and/or one or more other problems not discussed.

BRIEF DESCRIPTION OF THE DRAWINGS

There now follows a description of an embodiment of the invention, by way of non-limiting example, with reference being made to the accompanying drawings in which.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Figure 1:
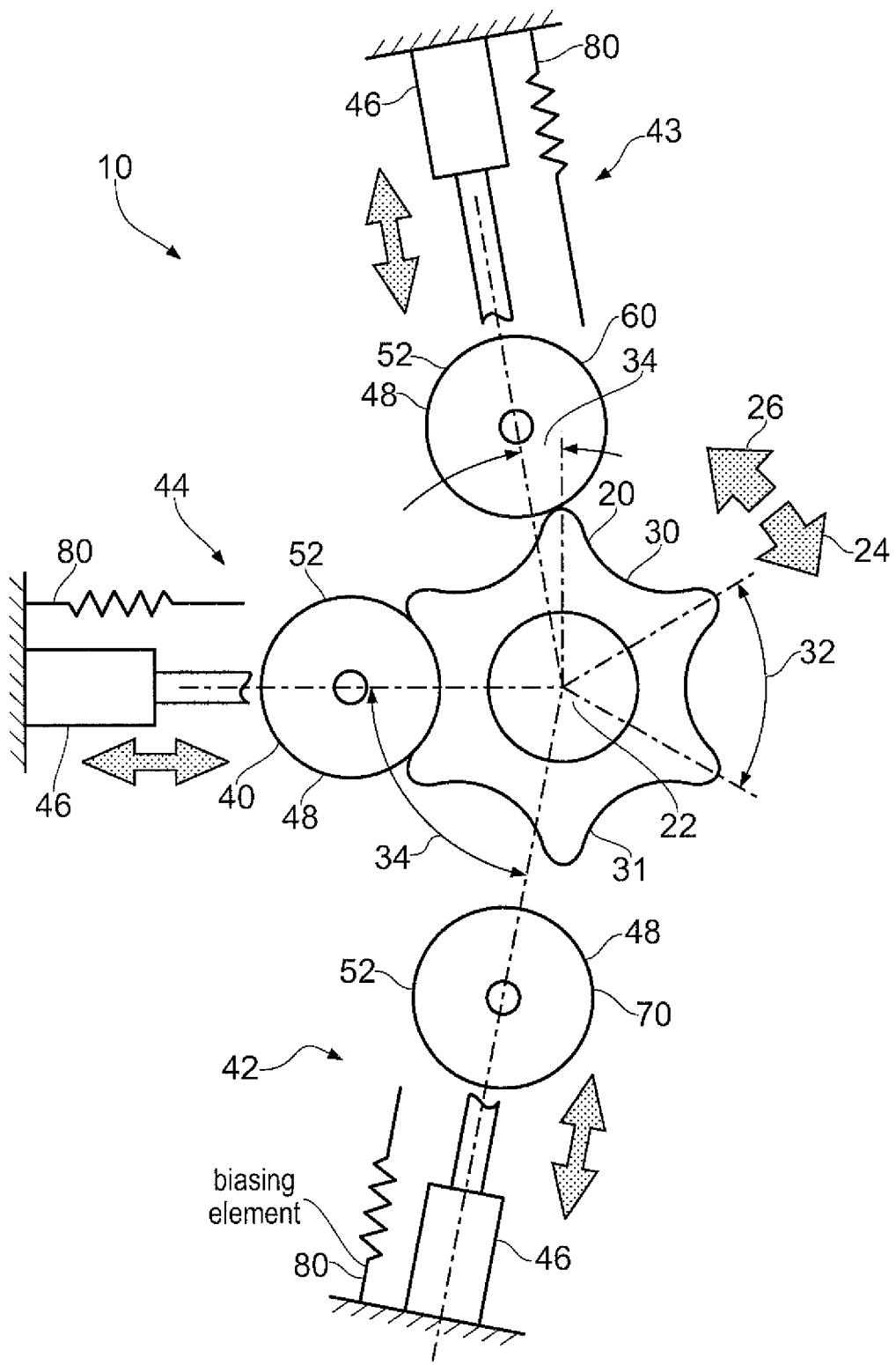
FIG. 1 shows a schematic partial view of a rotary actuator according to an embodiment of the present invention.
Figure 2:
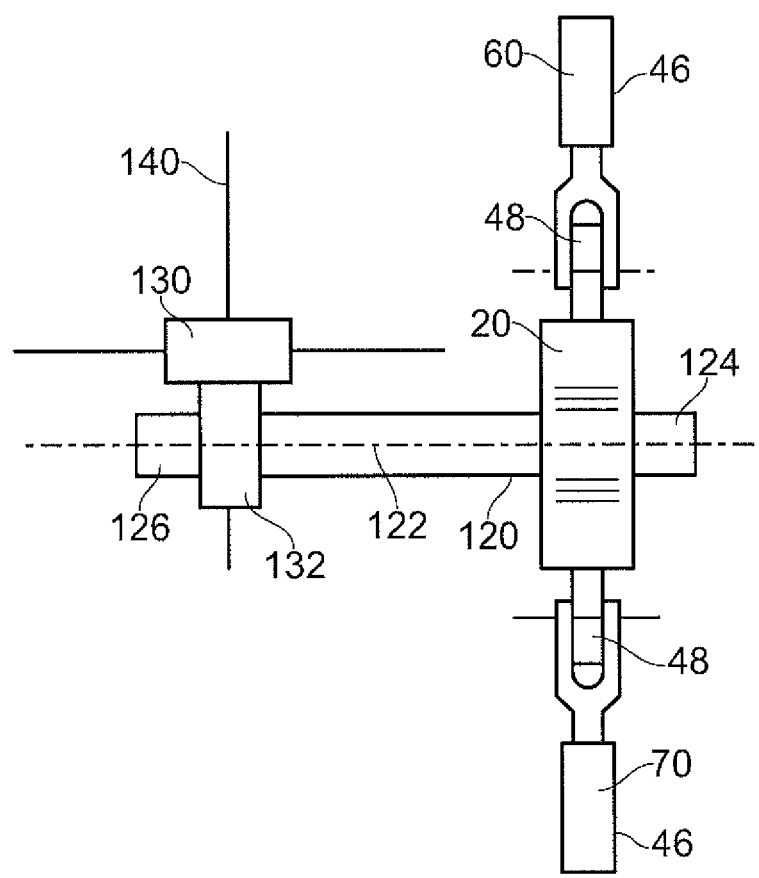
FIG. 2 shows a schematic plan view of the rotary actuator of FIG. 1.

Referring to FIGS. 1 and 2, a rotary actuator according to a first embodiment of the invention is designated generally by the reference numeral 10. In the present example, the rotary actuator 10 forms part of a control rod assembly 140 for use in moderating the nuclear reactions occurring within a nuclear reactor core (not shown).

The rotary actuator 10 comprises a driven element 20 in the form of a fluted element having an axis of rotation 22, and first second and third latch elements 40,60,70.

The driven element 20 comprises a plurality of radiussed flutes or recesses 30. In a typical example the driven element has six recesses 30 arranged symmetrically and circumferentially around the axis of rotation 22. These recesses each typically have a radius of approximately 40 mm.

The arrangement of the recesses 30 circumferentially around the axis of rotation 22 of the driven element 20 is defined by the spacing angle 32. The spacing angle 32 represents the angular pitch of the recesses 30, i.e. the angle between corresponding points on two adjacent recesses 30. In the present example, the spacing angle 32 is 60°.

The first, second and third latch elements 40,60,70 are positioned in a co-planar arrangement, with the plane of the latch elements 40,60,70 being generally normal to the axis of rotation 22 of the driven element 20.

The second and third latch elements 60,70 are each angularly offset from the first latch element 40, around the axis of rotation 22, in opposite angular directions to one another, by an offset angle 34. In other words, the second latch element 60 is angularly offset from the first latch element 40 in a first angular direction 24, while the third latch element 70 is angularly offset from the first latch element 40 in a second opposite angular direction 26.

The offset angle 34 is greater than the spacing angle 32. In the present example, the offset angle 34 is approximately 1.33 times the spacing angle 32; in the present example this offset angle is 80°.

Each latch element 40,60,70 is movable between a retracted position 42 and an extended position 44. In the retracted position 42, the latch element 40,60,70 is spaced apart from the recesses 30 of the driven element 20. In the extended position 44, the latch element 40,60,70 is engagingly located against one of the recesses 30 of the driven element 20.

Movement of the latch elements 40,60,70 between corresponding retracted and extended positions 42,44 is effected by a hydraulic actuator 46. Each latch element 40,60,70 comprises a biasing element 80 which biases the corresponding latch element 40,60,70 into its retracted position 42.

Each of the first, second and third latch elements 40,60,70 comprises a circular engaging element 48. Each of the engaging elements 48 is configured such that, when the corresponding latch element 40,60,70 is in the extended position 44, the engaging element 48 engagingly locates against a corresponding one of the recesses 30.

As shown in FIG. 2, a shaft 120 connects the driven element 20 to a pinion gear 132. The driven element 20 is positioned at a first end 124 of the shaft 120 with the pinion gear 132 being positioned at a second end 126 of the shaft 120. The axis of rotation 122 of the shaft 120 is concentric with the axis of rotation 22 of the driven element 20.

The pinion gear 132 is engaged with a rack 130 which is attached to a control rod assembly 140 which is insertable into the core of the nuclear reactor.

Figure 3:
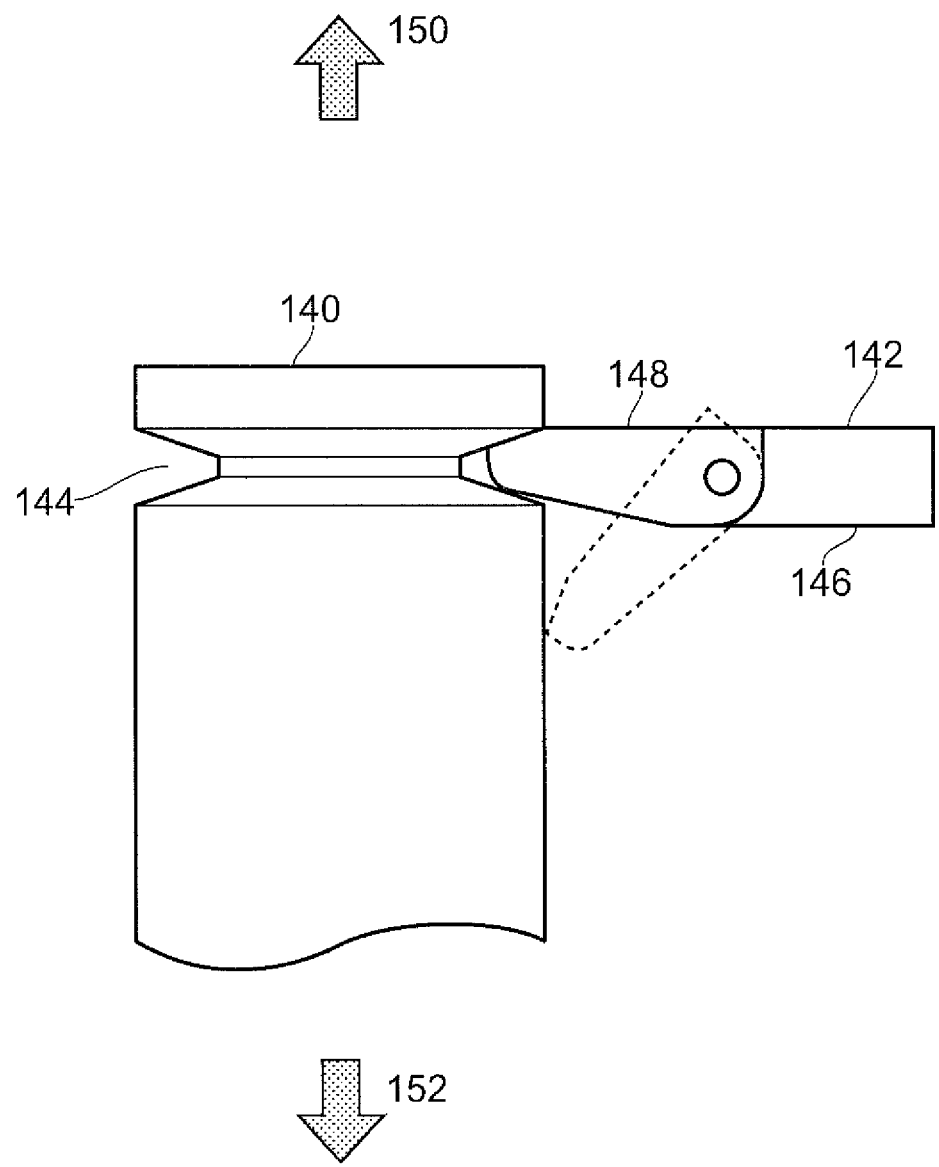
FIG. 3 shows a schematic partial elevational view of the rotary actuator of FIG. 1 showing the brake element.

As shown in FIG. 3, the control rod assembly 140 comprises a brake element 142 which is engagingly locatable against a brake recess 144 located at one end of the control rod assembly 140. The brake element 142 comprises a body portion 146 and an engaging portion 148 which is hingedly connected to the body portion 146. The engaging portion 148 is maintained in alignment with the body portion 146 by a spring element (not shown). The spring element allows the engaging portion 148 to move away from alignment with the body portion 146 in one direction but not in a corresponding opposite direction.

When the brake element 142 is engagingly located against the brake recess 144, the control rod assembly 140 is prevented from moving in a first direction 150. However, the hinged mounting arrangement of the brake element engaging portion 148 allows movement of the control rod assembly 140 in a second direction 152.

In use, the rotary actuator 10 is connected via the shaft 120 and the rack and pinion 130,132 to one end of a control rod assembly 140 which is contained within the core of a nuclear reactor assembly. With the control rod assembly 140 positioned within the reactor core, the first second and third latch elements 40,60,70 are each in their respective retracted positions 42.

In order to withdraw the control rod assembly 140 from the reactor core, the rotary actuator 10 operates to rotate the driven element 20 by a sequential actuation of the first, second and third latch elements 40,60,70 (described in more detail below). The rotation of the driven element 20 is transmitted via the shaft 122 to the pinion gear 132 which in turn causes linear movement of the rack 130. This linear movement of the rack 130 enables withdrawal of the control rod assembly 140 from the reactor core.

Figure 4:
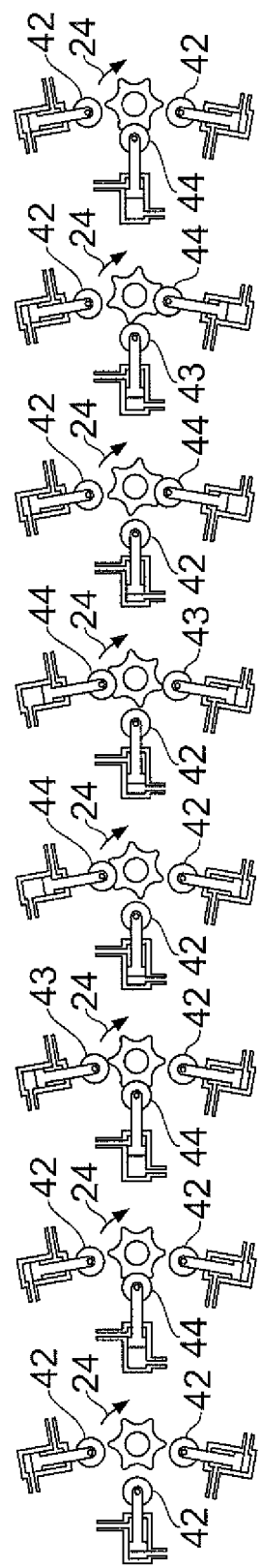
FIG. 4 shows a series of schematic views of the driven element and latch elements of the rotary actuator of FIG. 1 showing the actuation sequence of the latch elements required to rotate the driven element in a first direction.

Turning to the detailed operation of the rotary actuator, as shown in FIG. 4, the first latch element 40 is initially moved from a retracted position 42 to an extended position 44 in which the corresponding engaging element 48 engages with a recess 30 of the driven element 20.

With the first latch element 40 engaged with the driven element 20, the second latch element 60 is then moved from a retracted position 42 to a partially extended position 43. The second latch element 60 is offset from the corresponding recess 30 by an offset angle 34 relative to the alignment of the first latch element 40 with its corresponding recess 30. Consequently, the engaging element 48 of the second latch element 60 contacts a respective recess 30 of the driven element 20 in a partially extended position 43 before being fully engaged with the respective recess 30.

Once the engaging element 48 of the second latch element 60 contacts the respective recess 30 of the driven element 20 in the partially extended position 43, the driven element 20 is positively located by both the first and second latch elements 40,60. The first latch element 40 may then be moved to its retracted position 42 with the driven element 20 being positively located by the engaging element 48 of the second latch element 60.

Further movement of the first latch element 40 towards its retracted position 42 is matched by a corresponding movement of the second latch element 60 from the partially extended position 43 to its extended position 44.

As the second latch element 60 continues its movement from its partially extended position 43 towards its extended position 44, the engaging surface 52 of the respective engaging element 48 rolls across the flank surface 31 of the corresponding recess 30 causing rotation of the driven element 20 in a first angular direction 24.

When the second latch element 60 reaches its extended position 44, the first latch element 40 has been retracted sufficiently far that its engaging element 48 is clear of the driven element 20.

At this point, with the second latch element 60 held in its extended position 44, the third latch element 70 is then moved from a retracted position 42 to a partially extended position 43. The third latch element 70 is also angularly offset from the corresponding recesses 30 by an offset angle 34 relative to the alignment of the first latch element 40 with its corresponding recess 30, but in an opposite angular direction to the angular offset of the second latch element 60 from the first latch element 40. Consequently, the engaging element 48 of the third latch element 70 contacts a respective recess 30 of the driven element 20 in a partially extended position 43, before being fully engaged with the respective recess 30.

Once the engaging element 48 of the third latch element 70 contacts the respective recess 30 of the driven element 20 in the partially extended position 43, the driven element 20 is positively located by the engaging element 48 of both the second and third latch elements 60,70. The second latch element 60 may then be moved to its retracted position 42 with the driven element 20 being positively located by the engaging element 48 of the third latch element 70.

Further movement of the second latch element 60 towards its retracted position 42 is matched by a corresponding movement of the third latch element 70 from the partially extended position 43 to its extended position 44.

As the third latch element 70 continues its movement from its partially extended position 43 towards its extended position 44, the engaging surface 52 of the respective engaging element 48 rolls across the flank surface 31 of the corresponding recess 30 causing rotation of the driven element 20 in a first angular direction 24.

When the third latch element 70 reaches its extended position 44, the second latch element 60 has been retracted sufficiently far that its engaging element 48 is clear of the driven element 20.

This process of the sequential actuation of the first, second and third latch elements 40,60,70 may be repeated to provide continued rotation of the driven element 20 in the first angular direction 24. The sequence of actuation of the first, second and third latch elements 40,60,70 is shown in Table 1, where '0' denotes a latch element 40,60,70 being in the retracted position 42, and '1' denotes a latch element 40,60,70 being in the extended position 44.

TABLE 1

Actuation of the first, second and third latch elements to provide rotational motion of the driven element in a first direction
Rotation of driven element in a first direction

| first latch element | second latch element | third latch element |
|---|---|---|
| 1 | 0 | 0 |
| 1 | 1 | 0 |
| 0 | 1 | 0 |
| 0 | 1 | 1 |
| 0 | 0 | 1 |
| 1 | 0 | 1 |
| 1 | 0 | 0 |

Figure 5:
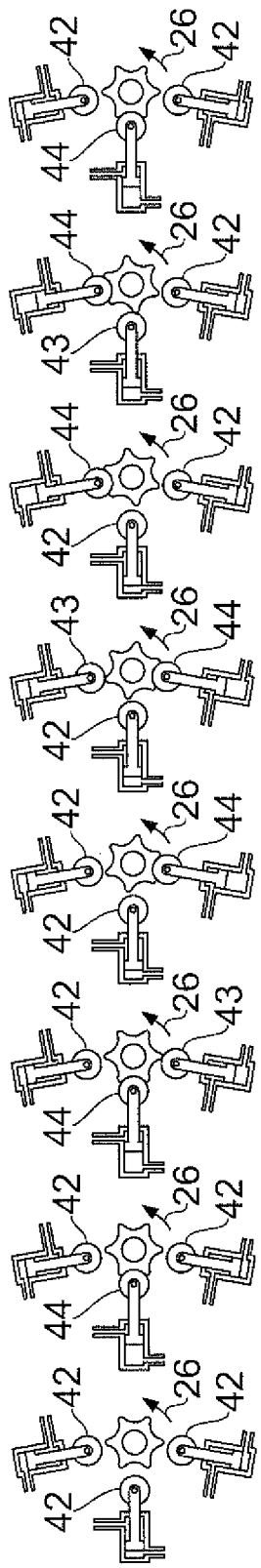
FIG. 5 shows the corresponding schematic views to those of FIG. 4 showing the corresponding actuation sequence of the latch elements required to move the driven element in an opposite second direction.

Rotation of the driven element 20 in a second angular direction 26, opposite to the first angular direction 24, is effected by a sequential actuation of the first, third and second latch elements 40,70,60 respectively, as shown in FIG. 5.

In the same way as described above for rotation of the driven element 20 in the first angular direction 24, with the first latch element 40 engaged with the driven element 20 (i.e. in its extended position 44), the third latch element 70 is then moved from a retracted position 42 to a partially extended position 43.

Once the engaging element 48 of the third latch element 70 contacts a respective recess 30 of the driven element 20, further movement of the third latch element 70 towards its extended position 44 is matched by a corresponding movement of the first latch element 40 towards its retracted position 42.

As shown in Table 2, the sequential actuation of the first, third and second latch elements 40,70,60 respectively results in rotation of the driven element 20 in the second angular direction 26.

The sequence of actuation of the latch elements 40,60,70 required to provide continued rotation of the driven element 20 in the second angular direction 26 is shown in Table 2, where '0' denotes a latch element 40,60,70 being in the retracted position 42, and '1' denotes a latch element 40,60,70 being in the extended position 44.

TABLE 2

Actuation of the first, second and third latch elements to provide rotational motion of the driven element in a second direction
Rotation of driven element in a second direction

| first latch element | second latch element | third latch element |
|---|---|---|
| 1 | 0 | 0 |
| 1 | 0 | 1 |
| 0 | 0 | 1 |
| 0 | 1 | 1 |
| 0 | 1 | 0 |

TABLE 2-continued

Actuation of the first, second and third latch elements to provide rotational motion of the driven element in a second direction
Rotation of driven element in a second direction

| first latch element | second latch element | third latch element |
|---|---|---|
| 1 | 1 | 0 |
| 1 | 0 | 0 |

In this way, the sequential actuation of the first, second and third latch elements 40,60,70 and correspondingly the first, third and second latch elements 40,70,60 respectively enables the rotary actuator 10 to rotate the driven element 20 in respective first and second angular directions 24,26. This rotation of the driven element 20 is stepwise in nature with the step size being determined by the spacing length 32. The travel of the driven element 20 is limited only by the length of the driven element 20 itself.

The presence of the biasing elements 80 ensures that, in the event of failure of the hydraulic power supply to the actuating portions 46, each of the latch elements 40,60,70 is returned to its respective retracted position 42. In such circumstances the weight of the attached control rod assembly 140 will cause the control rod assembly 140 to move downwards under its own weight. This movement of the control rod assembly 140 is transmitted via the rack and pinion 130,132 to the driven element 20 which rotates in the second angular direction 26 until the control rod assembly 140 is fully inserted into the reactor core, i.e. failsafe operation.

There is a requirement that uncontrolled withdrawal of the control rods used in nuclear reactor cores be prevented. This is termed a 'lock down' requirement. The actuation of the brake element 142 meets this requirement by locking the driven element 20 in position with the control rod assembly 140 fully inserted into the reactor core.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims.

The invention claimed is:

1. A rotary actuator comprising:
a driven element comprising an axis of rotation and a plurality of recesses, the recesses being spaced around the axis of rotation by a spacing angle; and
first, second and third latch elements, each latch element being movable between a retracted position, and an extended position in which it engagingly locates against one or more of the plurality of recesses;
wherein the first latch element is angularly offset from the second and third latch elements respectively in rotationally opposite directions around the axis of rotation by an offset angle, the offset angle being greater than the spacing angle;
whereby sequential movement of the first, second and third latch elements between respective retracted and extended positions causes rotation of the driven element.

2. The rotary actuator as claimed in claim 1, wherein each of the plurality of recesses is positioned in a co-planar arrangement around the axis of rotation.

3. The rotary actuator as claimed in claim 1, wherein each of the first, second and third latch elements is biased towards the respective retracted position.

4. The rotary actuator as claimed in claim 1, wherein each of the first, second and third latch elements has an actuating portion being configured to move the latch element between retracted and extended positions.

5. The rotary actuator as claimed in claim 4, wherein each actuating portion is one of a mechanical, hydraulic or pneumatic actuator.

6. The rotary actuator as claimed in claim 1, wherein each of the first, second and third latch elements comprises a circular engaging element, the engaging element being arranged to engagingly locate in one of the plurality of recesses.

7. A control rod assembly for a light water nuclear reactor comprising:
a control rod, having a plurality of lateral recesses, the recesses being spaced apart from one another along the control rod;
a rotary actuator as claimed in claim 1; and
a brake element configured to engage with at least one of the plurality of recesses to prevent linear movement of the control rod.

8. A method of using a rotary actuator, the rotary actuator comprising:
a driven element comprising an axis of rotation and a plurality of recesses, the recesses being spaced around the axis of rotation by a spacing angle; and
first, second and third latch elements, each latch element being movable between a retracted position, and an extended position in which it engagingly locates against one or more of the plurality of recesses;
wherein the first latch element is angularly offset from the second and third latch elements respectively in rotationally opposite directions around the axis of rotation by an offset angle, the offset angle being greater than the spacing angle;
the method comprising the steps of:
(a) moving the first latch element from its retracted position to its extended position; and
(b) moving the second latch element from its retracted position to a partially extended position in which it contacts the driven element; and
(c) returning the first latch element from its extended position to its retracted position whilst simultaneously continuing the movement of the second latch element from its partially extended position to its extended position, thereby causing a first rotation of the driven element around the axis of rotation in a first direction.

9. The method as claimed in claim 8, comprising the further steps of:
(d) moving the third latch element from its retracted position to a partially extended position in which it contacts the driven element; and
(e) returning the second latch element from its extended position to its retracted position whilst simultaneously continuing the movement of the third latch element from its partially extended position to its extended position, thereby causing a second rotation of the driven element around the axis of rotation in a first direction.

10. The method as claimed in claim 9, comprising the further steps of:
(f) moving the second latch element from its retracted position to its partially extended position in which it contacts the driven element; and
(g) returning the third latch element from its extended position to its retracted position whilst simultaneously continuing the movement of the second latch element from its partially extended position to its extended position, thereby causing a first rotation of the driven element around the axis of rotation in a second direction.

11. The method as claimed in claim 10, comprising the further steps of:
   (h) moving the first latch element from its retracted position to its partially extended position in which it contacts the driven element; and
   (i) returning the second latch element from its extended position to its retracted position whilst simultaneously continuing the movement of the first latch element from its partially extended position to its extended position, thereby causing a second rotation of the driven element around the axis of rotation in a second direction.

12. A method of deploying a control rod for a light water nuclear reactor, the nuclear reactor comprising a control rod assembly having a control rod and a rotary actuator, the method comprising the step of:
   (1) using the rotary actuator according to the method of claim 8 to drivingly rotate a shaft, the shaft being coupled to the control rod, so as to control the insertion of the control rod into the nuclear reactor.

13. The method as claimed in claim 12, the control rod assembly comprising a brake element, the brake element being movable between a retracted position and an extended position, the method comprising the further step of:
   (2) moving the brake element from the retracted position to the extended position, thereby preventing rotation of the shaft and maintaining the control rod in a fixed position within the nuclear reactor.

14. The rotary actuator as claimed in claim 1, wherein when the first latch element is in the extended position to engagingly locate against one or more of the plurality of recesses, the second and third latch elements respectively are not in the extended position.

* * * * *